L. W. COLVER.
Grain-Drill.
No. 10,565. Patented Feb. 28. 1854.
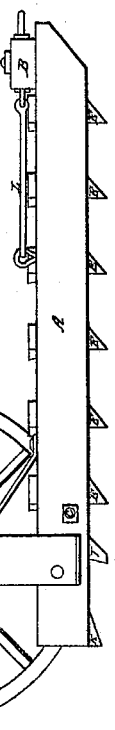
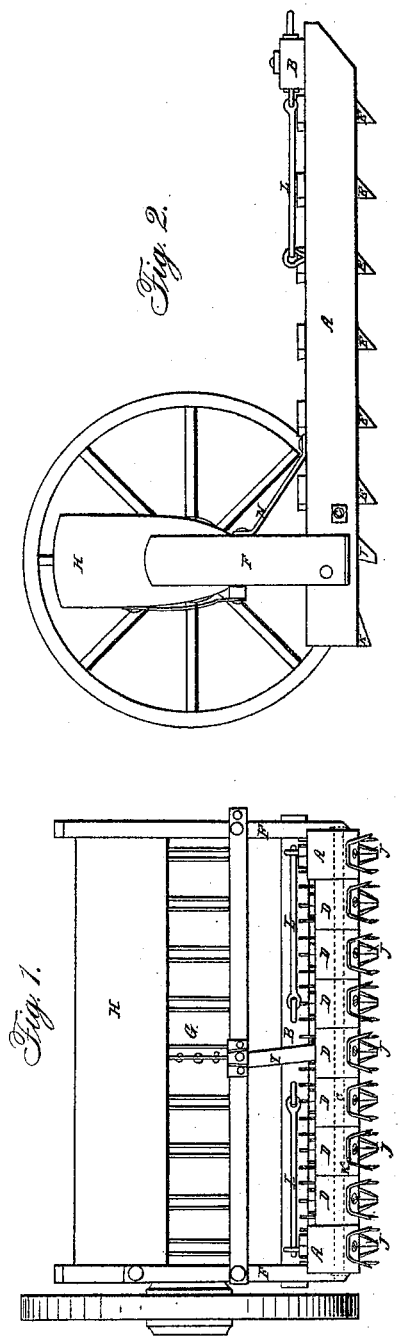
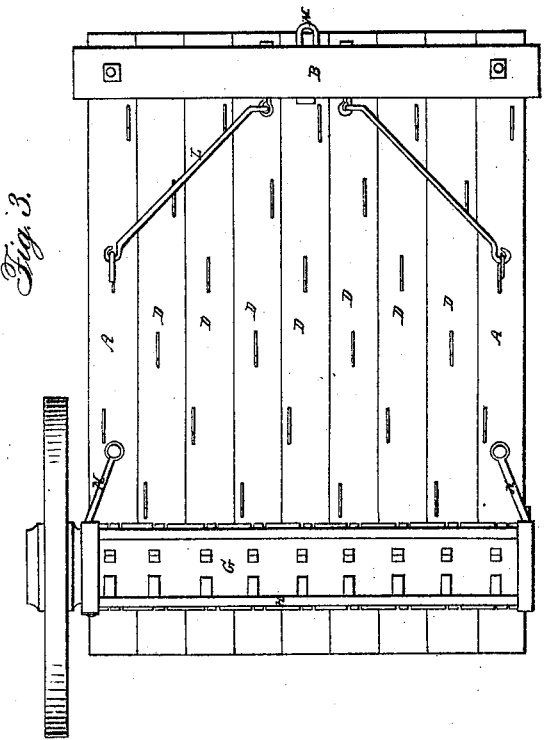

UNITED STATES PATENT OFFICE.

LEWIS W. COLVER, OF LOUISVILLE, KENTUCKY.

IMPROVEMENT IN SEED-PLANTERS.

Specification forming part of Letters Patent No. 10,565, dated February 28, 1854.

*To all whom it may concern:*

Be it known that I, LEWIS W. COLVER, of Louisville, in the county of Jefferson and State of Kentucky, have invented certain new and useful improvements in seed-planters and pulverizers or cultivators for working the ground, opening furrows, dropping the seed, and covering them over all at one operation; and I do hereby declare the following to be a full, clear, and exact description of the same, reference being had to the accompanying drawings, making a part thereof, in which—

Figure 1 represents a view from the rear of the machine. Fig. 2 represents a side view, Fig. 3 represents a top view, and Fig. 4 represents a perspective view, of the rear of one of the stocks with the covering-shoe thereon.

Similar letters in the several figures denote like parts.

The nature of my invention consists in so combining a pulverizer or cultivator with a seed-planter as that the soil shall be mellowed up, the furrow opened, the seed dropped therein, and covered over at one and the same operation.

To enable those skilled in the art to make and use my invention, I will proceed to describe the same with reference to the drawings.

A A are two strong outside beams, connected at front by a cross-beam, B, firmly bolted thereto. A rod, C, passes through the rear of these side pieces, A, on which are arranged the stocks D D D, &c., so as to make an almost solid platform of wood. The stocks, being free to rise at their front ends, which are also beveled off, so as to mount over any obstruction, play upon this rod C, and if found advisable to give the stocks a rising and falling motion in the rear it can be done by making the holes through them, through which the rod passes, oblong. The stocks D are furnished with cutters or teeth E E E, (better seen in Fig. 3,) whose front edges may be quite sharp, and also beveled off, so as to mount up or over an obstruction. When drawn forward these knives have a double motion—viz., forward and up and down—which gives them a constant chopping motion, and effectually cuts up the grass and sods, and leaves the ground in a perfectly mellow state for receiving the seed to be sown. Two uprights, F, are arranged, one on each of the side pieces, A, and in suitable bearings therein is arranged the seeding-cylinder G, on the journals of which cylinder the wheel or wheels for supporting and carrying the machine may be placed. Over the seeding-cylinder is placed the hopper H.

I is an elastic tube for conveying the seed from the grooves of the seeding-cylinder down through suitable openings in the stocks into the furrow opened by the shoes J thereon.

J J, &c., are covering-shoes on the rear of the stocks (better seen in Fig. 4) for throwing up the mellowed or pulverized earth over the seed in the furrow. By this arrangement I avoid the necessity of drag-bars, wooden pins, triggers, and other devices for tripping the shoe when it strikes against any hard material, which are actually necessary to seeding-machines as heretofore constructed.

L L are brace-rods for strengthening the cross-beam B, which carries the clevis M by which the machine is drawn forward.

N are braces for staying the uprights F.

Other seeding apparatus than what is herein specially described may be used, and I do not limit myself to the exact form mentioned.

Having thus fully described the nature of my invention, what I claim therein as new, and desire to secure by Letters Patent, is—

The combination of the loosely-hinged stocks with their teeth E and shoes J K, and a seeding apparatus, substantially as described, and for the purpose of mellowing the soil, opening the furrows, dropping, and covering the seed at one operation, as set forth.

L. W. COLVER.

Witnesses:
JOHN R. WOODS,
E. BLISS.